United States Patent

[11] 3,634,095

[72] Inventor Miles J. Willard
 3067 Gustafson Circle, Idaho Falls, Idaho 83401
[21] Appl. No. 782,482
[22] Filed Dec. 9, 1968
[23] Continuation-in-part of Ser. No. 383,964, July 20, 1964, abandoned and continuation-in-part of Ser. No. 679,226, Oct. 30, 1967, abandoned.
[45] Patented Jan. 11, 1972

[54] PREPARING A POTATO SNACK PRODUCT
 3 Claims, No Drawings
[52] U.S. Cl..................................................... 99/100 P, 99/207
[51] Int. Cl..................................................... A23l 1/00
[50] Field of Search............................................99/100, 207

[56] References Cited
UNITED STATES PATENTS
2,101,506  12/1937  Mottow et al.................  99/100

OTHER REFERENCES

Siciliano et al. Potato Nuts, 1956, USDA ARS-73-15, (pp. 1-3).

Talburt et al., Potato Processing, 1959, Avi Publ. Co., Westport, Conn. (pp. 243, 245, 246 & 264-266), SB211P8T3C2.

Copley et al., Food Dehydration, The Avi Publ. Co., Westport, Conn., 1964, (pp. 342-345), TX609V35C.2

Primary Examiner—Lionel M. Shapiro
Assistant Examiner—D. M. Naff
Attorney—Christie, Parker & Hale ABSTRACT: A crisp fried snack product is prepared from pieces of raw potatoes by the steps of dehydration to within a critical moisture range of about 20 percent to 40 percent by weight, equilibration for at least 2 hours, frying at a temperature between 350° F. and 425° F. for 6 to 60 seconds, and finish drying, if necessary to reduce moisture below 5 percent by weight. Alternately, the product is manufactured from potato pieces previously dehydrated to below 10 percent moisture by weight, and thereafter rehydrated to within the same moisture range, followed by the same processing steps.

PREPARING A POTATO SNACK PRODUCT

RELATED APPLICATIONS

This invention is a continuation-in-part of my copending applications Ser. No. 383,964 filed July 20, 1964 (now abandoned) and Ser. No. 679,226 filed Oct. 30, 1967 (now abandoned).

BACKGROUND OF THE INVENTION

Potato chips and shoestring potatoes are well known snack items prepared by frying pieces of raw, fresh potatoes having a reducing sugar content preferably below 0.5 percent by weight on a moisture free basis. A higher concentration of sugar results in a dark brown final product, which is generally not acceptable. Because of increased competition and high industry-wide quality standards, manufacturers must avoid processing potatoes with relatively high reducing sugar content, which tends to increase during storage of raw potatoes. For example, to avoid accumulation of reducing sugars during storage of potatoes to be used to make potato chips, they must be stored at relatively high temperatures, which cause considerable losses by shrinkage and rotting. If the reducing sugar content exceeds 0.5 percent by weight of the potato, fried products made from the potato are excessively brown. Desirably, light-colored products can be made from "high sugar" potatoes only by more expensive techniques such as hot water extraction or microwave finish drying (see Potato Processing, 2nd Edition, published by Avi) to avoid the undesired browning.

Large quantities of processing grade potatoes are potentially available for conversion into snack products, except the storage conditions used for these potatoes, for example in the production of frozen french fried potatoes, is such that the reducing sugar content often exceeds 0.5 percent. Attempts are made to maintain the reducing sugar content at 1 percent to 2 percent in such products, but growing and storage conditions are such that potatoes of 4 percent to 6 percent reducing sugars are at times produced. As a result of this, many potatoes are converted to other less profitable products such as dehydrated mashed potatoes and dehydrated diced potatoes. These well-known products can tolerate the presence of higher quantities of reducing sugars, because there is no frying involved in their manufacture or use.

Because of the high inherent value of snack products, attempts have been made in the past to convert dehydrated diced potatoes into fried snack products. Several of these processes are described by Siciliano in "Potato Nuts, a New Type of Snack," 1956, USDA Bulletin ARS-73-15.

None of the procedures described by Siciliano is commercially feasible. The chief problem found in all the prior art is the requirement of potatoes with less than about 0.5 percent reducing sugars, and the presence of objectionable amounts of hard and horny particles in the finished products.

In a fully dehydrated, i.e., moisture less than about 10 percent by weight, diced potato piece, the potato cells are closely packed, causing the product to be hard and brittle. In normal use such products are soaked in hot water to reconstitute the potato solids to near the original moisture content (77 percent to 84 percent) of the potato. Attempts have been made to make quicker cooking dehydrated potato products by an explosive puffing method. Such a method, described by Eisenhardt in "Quick Cooking Dehydrated Vegetable Pieces," Food Technology 1962, Vol. 16, No. 5, pages 143-146, involves holding potatoes that have been dehydrated to within the moisture range of 24 percent to 53 percent. The partially dried potato pieces were raised to 250°–294° F. over a 5 to 8 minute period in a typical cereal-type puffing gun, and exploded from the gun to effect cell separation by the rapid removal of moisture by expansion. The potato pieces were later finish dried to produce a stable dehydrated quick-cooking product. This product, however, cannot be utilized as a snack product, because it is hard, and the typical fried potato flavor is not present.

In summary, diced dehydrated potatoes have not become adapted to snack manufacture for several reasons. The product in its natural dried state is hard and requires cell separation to achieve a desirable texture. Previous attempts to achieve this by a controlled frying step have failed due to the high level of reducing sugar normally found in the products which necessitated the use of low frying temperatures to avoid excess color development. Frying at low temperatures, say 325° F., results in inadequate cell separation; therefore, a large proportion of hard and horny particles remain in the product.

Moreover, the natural variation of water content of pieces cut from the same potato makes it difficult to produce a commercially acceptable puffed snack from raw potatoes which are fried directly without dehydration to obtain the optimum water content and distribution.

SUMMARY OF THE INVENTION

Generally speaking, this invention provides a method for treating potatoes, including those having a sugar content in excess of 0.5 percent, to make a crisp snack product resembling a potato "nut." The process can be practiced either on fresh potato pieces dehydrated to between about 20 percent and about 40 percent by weight, or on potato pieces which have been previously dehydrated to lower levels, stored for an indefinite period, and subsequently rehydrated to the higher moisture content required for this process. I have found that by adjusting the moisture content of the potato pieces from about 20 percent to about 40 percent, holding the potato pieces in that moisture range for a period of at least two hours, and frying at high temperature (between about 350° F. and about 425° F.) to effect cell separation, produces a crisp snack product which has a desirable texture and flavor. One of the critical steps in the process is the quick, i.e., less than about 60 seconds, frying of the equilibrated potato pieces at a temperature from 350° to 425° F., preferably about 400° F. Although it is possible to produce acceptable products from potatoes having extremely low reducing sugar content by frying at lower temperatures, the use of short-time, high-temperature frying step overcomes the disadvantages cited by previous investigators and permits the use of normal processing grade potatoes for the production of this snack product. The fat content of the finished product is only 15 percent to 25 percent, compared to about 35 percent in a standard potato chip and other similar snack products.

By performing the frying step at such a high temperature, a more explosive escape of water vapor from the potato cell structure is obtained, thereby yielding products of lower bulk density and more tender texture than when they are fried at more conventional lower temperatures. Products so treated will normally not be reduced enough in moisture content for maximum storage stability; therefore, the frying step is accompanied by a finish drying step, performed in any conventional manner, such as in a rotating drum held at 220° F. for 10 to 15 minutes. After this, the product at about 1.5 percent to 3.5 percent final moisture, is packaged with appropriate seasoning.

Other advantages of the process will be apparent from the more detailed discussion of the two embodiments of the process which follows.

EMBODIMENT 1 USING RAW POTATOES

Raw potatoes are washed, peeled, trimmed, and cut into appropriate sizes in a conventional manner. It is particularly advantageous if they are cut with one thin dimension not exceeding about three-sixteenth inch. For example, the potatoes are cut into round slices with thickness of one-eighth inch, or alternatively, are diced to sizes such as ½ inch × ½ inch × ⅛ inch, ¾ inch × ¾ inch × ⅛ inch, or, if desired, ⅜ inch × ⅜ inch × 3/16 inch. The potatoes may be of any variety, although a high solid content variety such as the Idaho Russet Burbank is normally used for processing and is ideally suited for preparing this product. The diced potatoes are normally washed to remove surface starch, blanched in steam or water to a negative peroxidase value, treated with water sprays to remove surface starch to avoid sticking during dehydration, treated with well-known preservatives such as sodium bisulfite or calcium chloride, and dried to between about 20 percent and about 40 percent water by weight, typically in a through-circulation conveyor drier.

If desired, pieces to be converted into snacks can be blanched somewhat longer than those prepared for normal purposes, e.g., frozen french fired potatoes. Extending the blanching further softens the pectic bonds between the potato cells and produces a more tender product after final frying. In addition, agents such as sodium chloride, sodium phosphate and sodium citrate, known to weaken the bonds between potato cell walls, can be incorporated prior to drying. While these steps are advantageous and are well known to those in the art, they are not necessary, however, for the successful performance of the process. In this embodiment of the invention the dehydration is controlled so that the product is removed from the drier within the moisture range of 20 percent to 40 percent by weight (wet basis). The partially dried potato pieces are held in suitable closed sanitary containers for between about 2 to about 24 hours at room temperature to redistribute the moisture more uniformly throughout each potato piece. The equilibration step is necessary because during the dehydration of diced potatoes, water is removed more rapidly from the surface of the pieces than it can be replaced by diffusion from within the interior of the individual piece. Consequently, the product is considerably "case-hardened" at the point of removal within this moisture range. In other words, there is a large moisture gradient within each piece from the wetter interior to the surface. Holding the pieces in the moisture range of about 20 percent to about 40 percent by weight permits a redistribution of the proper amount of moisture within each potato piece, and results in a uniform texture in the final fried product.

Because of the naturally occurring variation in solid content within the potato, it is difficult to obtain a uniform moisture content in randomly cut pieces dried to within the range of 20 percent to 40 percent water. For example, studies have shown that in a raw potato tuber having an average moisture content of 80 percent, there is a distribution of starch such that the moisture content within this single tuber can range from 74 percent to as high as 86 percent. In other words, while the average moisture content of potatoes of the Russet variety might by 80 percent as fed to the dehydrator, there is an actual variation in moisture content of potato pieces cut from various portions of the initial potato tuber of from about 74 percent to 86 percent. Although within the drier every effort is made to obtain uniform moisture removal, because of the piece-to-piece variation in moisture content of the incoming feed, it has been impossible to remove from the drier pieces having say, 25 percent moisture ±2 percent. During the period of equilibration some redistribution of the moisture content between the individual pieces undoubtedly occurs. Most of the equilibration, however, occurs within the individual pieces and considerable variations in moisture content between individual pieces still persists that can be related to the heterogeneity of the original potato tuber itself.

In previous attempts to produce a fried product from such partially dehydrated pieces, variations in the moisture content of the partially dehydrated pieces resulted in some products being overfried, others underfried. To attempt to overcome this problem, the pieces were fried at lower temperatures for a longer period of time, resulting in inadequate and nonuniform cell expansion and the production of hard and horny pieces. By the process of this invention, the use of a short, high temperature frying step, preferably at about 400° F. for about 12 seconds, expands all pieces adequately and substantially uniformly, in spite of the unavoidably large variation in moisture content between pieces. After the frying step, a finish drying of the fried pieces at relatively low temperatures, say 200° F., provides slow, gently removal of the final traces of moisture and a uniform finished product. Because of the short, high temperature frying time used in this invention, potatoes having higher initial reducing sugar can be utilized for the process without objectionable browning, and the production of hard, horny pieces as a result of the naturally occurring random moisture content of the partially dehydrated pieces is avoided.

EMBODIMENT 2 USING REHYDRATED DEHYDRATED POTATOES

In many instances it is more advantageous to dry the diced or sliced potatoes to a final moisture content of less than about 10 percent, and preferably about 7 percent by weight, so that they can be stored for an indefinite period before the production of the potato snack. In this matter the dehydrated products can be shipped to snack manufacturers in areas removed from potato processing locations. When the dehydrated potatoes are to be fried, they are first rehydrated by adding moisture so the total moisture present is between about 20 percent to about 40 percent by weight (wet basis). The potato pieces are held in this moisture range for at least 2 hours, and preferably between 4 hours and about 48 hours, to permit diffusion and equilibration of moisture to take place throughout the potato pieces. If desired, during this rehydration step, additional browning-inhibiting salts, such as sodium bisulfite, may be incorporated. Optionally, the potato pieces are coated with a stable fat or nonsticking agent to reduce clumping of the product to facilitate handling during the frying operation which follows.

After the potato pieces have been held the required period, they are fried in hot fat at a temperature of about 400° F. for about 12 seconds. Ordinarily the potato pieces are at room temperature when they are dropped into the hot fat. The internal temperature increases rapidly, causing the evaporation of water vapor and separation of the cells of the potato to form a uniformly expanded structure, which after final drying has a desirable crisp texture, somewhat more firm than a normal potato chip, but desirable as a flavorful snack product. With such a short frying period, the moisture content of the product discharged from the frier is normally about 6 percent to about 10 percent, and the product is not yet crisp enough for consumption, nor is it low enough in moisture content to permit extended storage. Accordingly the fried potato particles are further dehydrated to less than about 2 percent moisture by weight, using a current of air at about 200° F. The adjustment of drying conditions is well within the knowledge of those skilled in the art and a period of time of 10 to 15 minutes will normally suffice. If desired, higher drying temperatures may be used for a shorter period of time. This alternative may produce additional browning of the product, which may or may not be desirable.

Alternatively, if low sugar content potatoes are used in preparing the dehydrated product, say, containing 0.5 percent reducing sugars or less, the frying can be at the lower end of the 350°–425° F. range and extended to a period of up to 30 seconds to 1 minute, in which case the final dehydration step can be shortened or eliminated altogether. Normally, dehydrated diced potatoes of commerce contain from 2 percent to 6 percent reducing sugars by weight (moisture-free basis) and therefore this alternative is seldom employed. Products having low reducing sugar content can, of course, be fried at lower temperatures, but it has been found that improved texture is always obtained when the frying medium is held at 350° F. or above, preferably 400° F., due to the more rapid escape of moisture.

The following operating examples further illustrate this invention.

EXAMPLE 1

One hundred and fifty grams of commercially produced, diced dehydrated potatoes measuring 7/16 inch × 7/16 inch ×

⅛ inch, having a moisture content of 7.0 percent, a reducing sugar content of 5.4 percent and sulfite content of 480 p.p.m. made from Idaho Russet Burbank potatoes, were added to 16 ml. water and 12 ml. of a solution containing 12 grams of sodium bisulfite per 1,000 ml. of water. The product was equilibrated at room temperature in a closed container for 16 hours, and fried in stabilized coconut oil (melting point 92° F.) at 400° F. for 12 seconds. The fried products were then dried in a through-circulation drier at 200° F. for a period of 10 minutes. The sample had an average NPCI color of approximately 5 (National Potato Chip Institute color reference standard: 1—very light to 10—extremely dark). The product had a pleasing nutlike flavor and a uniformly crisp crunchy texture. There were no hard, horny pieces.

EXAMPLE 2

A sample of ½ inch × ½ inch × ⅛ inch dehydrated diced potatoes from the same source as those of example 1, containing 1.1 percent reducing sugar and 450 p.p.m. sulfite was processed by the same procedure described in example 1. The product was light (NPCI No. 3). This product was judged to be too light in appearance, and in subsequent samples produced from this raw material the frying time was extended to 15 to 20 seconds to result in a product having a color of 4 to 5.

Although the potato pieces are preferably equilibrated in a closed container, similar results can be obtained by storing them in a relatively large pile which provides a confined atmosphere to restrict surface evaporation of moisture from the pieces in the interior of the pile. Those pieces which form the outer layer of the pile and which may lose excessive amounts of moisture can be discarded.

The following table shows the effect of frying temperature on pieces (7/16 inch × 7/16 inch × ⅛ inch) of potatoes equilibrated in a confined atmosphere to reduce surface evaporation 20–24 hours at moisture contents of 10 percent, 20 percent, 25 percent, and 40 percent, by weight.

TABLE

| Sample number | Percent H2O (weight) | Fry temp, °F | Fry time, second | Color | Bulk index, c.c./gm. | Description of fried sample |
|---|---|---|---|---|---|---|
| 77-A | 10 | 325 | 12 | 4 | 3.8 | Chalky texture, variable texture and color. |
| 77-B | 10 | 350 | 12 | 6 | 4.5 | Do. |
| 77-C | 10 | 375 | 12 | 8 | 4.8 | Do. |
| 77-D | 10 | 400 | 12 | 9 | 4.9 | Do. |
| 78-A | 15 | 325 | 12 | 3 | 3.6 | Not expanded, some puffing. |
| 78-B | 15 | 350 | 12 | 4 | 4.0 | Some expanded, random color. |
| 78-C | 15 | 375 | 12 | 7 | 4.2 | Mostly expanded, chalky, random, color. |
| 78-D | 15 | 400 | 12 | 8 | 4.45 | Do. |
| 79-A | 20 | 325 | 12 | 2 | 3.5 | Not expanded, hard. |
| 79-B | 20 | 350 | 12 | 3 | 4.0 | Partially expanded. |
| 79-C | 20 | 375 | 12 | 5 | 4.2 | Good product. Slight variable color and texture. |
| 79-D | 20 | 400 | 12 | 7 | 4.6 | Do. |
| 80-A | 25 | 325 | 12 | 1 | 3.2 | Not expanded, hard. |
| 80-B | 25 | 350 | 12 | 2 | 3.8 | Partially expanded, slightly hard. |
| 80-C | 25 | 375 | 12 | 4 | 4.0 | Good product. |
| 80-D | 25 | 400 | 12 | 6 | 4.4 | Excellent product, tender. |
| 81-A | 40 | 325 | 12 | 1 | 3.1 | Not expanded. |
| 81-B | 40 | 350 | 12 | 1 | 3.2 | Do. |
| 81-C | 40 | 375 | 12 | 2 | 3.3 | Partially expanded. |
| 81-D | 40 | 400 | 12 | 4 | 3.7 | Good product. |

The "bulk index" in the foregoing table is the reciprocal of bulk density. The color rating is on the same scale as that described with respect to example 1.

The data in the foregoing table demonstrate that the water content of the potato pieces must be at least about 20 percent by weight, and that the frying temperature be greater than about 350° F. If the water content is as low as 15 percent by weight and the frying temperature is high enough to cause expansion, the final product has a chalky texture and variable color which is unsatisfactory for a snack. At a water content of 20 percent by weight and higher, the frying temperature must be above about 350° F. to expand the potato cells and produce a tender, crunchy snack.

Although the frying time was the same (12 seconds) for each of the samples, it can be reduced to about 9 seconds for sample 79–D and 80–D to lighten the color of the product to about 5 on the color scale.

Thus, this invention provides a process for frying commercially available potato pieces, even of high sugar content, to produce a tasteful snack product without the usual problems of over browning, or hard, horny pieces.

I claim:

1. The process of preparing a crisp snack item from a piece of potato, the process comprising the steps of dehydrating the piece of potato, partially rehydrating the dehydrated potato piece by adding moisture so the total moisture present is between about 20 percent and about 40 percent by weight of the total mass of the moisture and potato solids in the piece, holding the piece to equilibrate to a substantially uniform moisture throughout, contacting the piece with heated oil having a temperature between about 390° F. and about 425° F. for less than about 15 seconds to expand the piece by rapidly removing a portion of the water added during rehydration, and finish drying the expanded piece to a ready-to-eat condition at a temperature lower than 390° F. to drive off additional moisture to reduce the moisture content to below about 6 percent by weight.

2. The process according to claim 1 wherein the potato piece is held in contact with the fluid heating medium for between about 6 and about 15 seconds.

3. The process according to claim 1 wherein the expanded potato piece is finish dried at a temperature below about 300° F.